May 4, 1937.  C. P. DEIBEL  2,079,495
DRY CELL AND SEAL THEREFOR
Filed Nov. 7, 1935
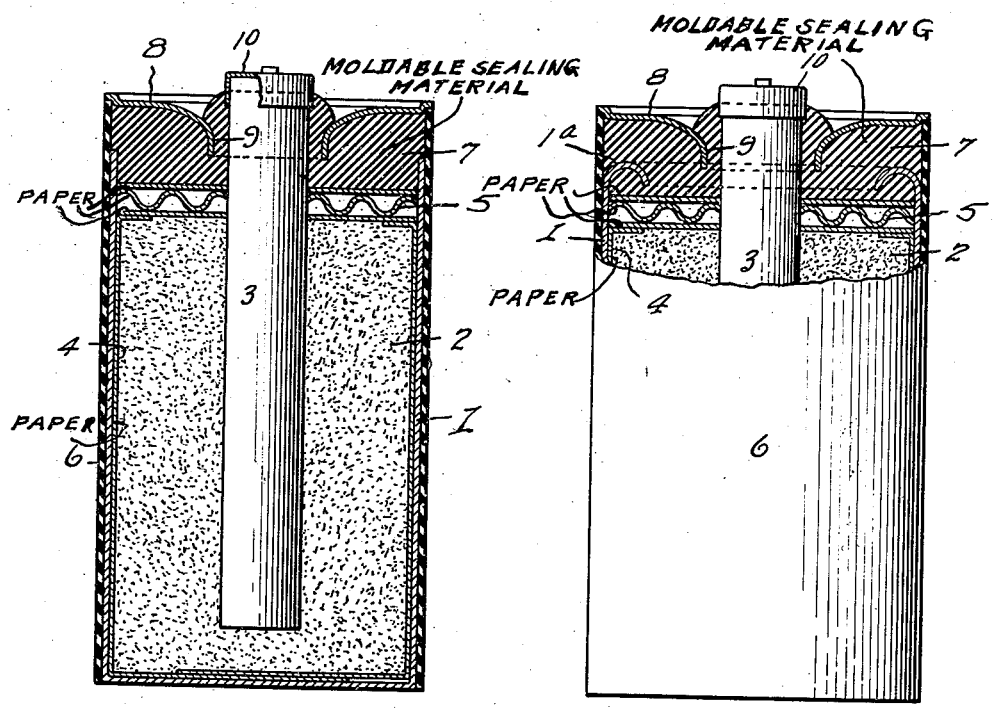
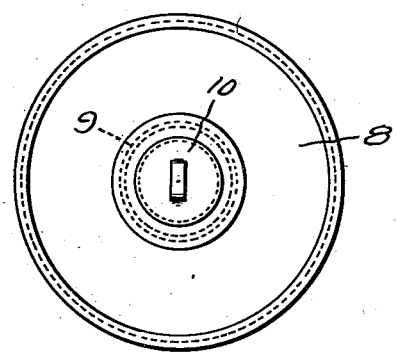
INVENTOR.
Cyril P. Deibel
BY Shull, Brock West
ATTORNEY.

Patented May 4, 1937

2,079,495

UNITED STATES PATENT OFFICE 2,079,495

DRY CELL AND SEAL THEREFOR

Cyril P. Deibel, Lakewood, Ohio

Application November 7, 1935, Serial No. 48,724

5 Claims. (Cl. 136—133)

This invention relates to primary batteries or cells and particularly to cells generally referred to as dry cells.

One of the main objects of the invention is to provide a dry cell of the character described which has an air tight seal in the top thereof together with a metal top or cover which completely closes the cell and is completely insulated from both the negative zinc element and the positive carbon element so as to eliminate the possibility of a short circuit.

Another object of the invention is to provide a dry cell of the character described which includes a metal container containing a mass of depolarizing mix and a carbon electrode, the container being enclosed within an electrical insulating jacket which is closed by a metal cover which surrounds the carbon electrode and is embedded in a mass of sealing material which is disposed partially inside and partially outside of the metal cover, that portion of the sealing material disposed exterior of the cover being molded about the carbon electrode and serving to hold the metal cover in place.

Another object of the invention is to provide a dry cell of the character described having two seals or covers, the inner seal being formed of a moldable sealing compound and the outer seal being formed of a metal cover which is insulated from both electrodes of the cell, the inner seal being bonded with an electrical insulating jacket which surrounds the zinc can and which serves to hold the jacket in place, the outer metal cover forming a close fit with the jacket.

Another object of the invention is to provide a dry cell of the character described which comprises a metal container in which is arranged a carbon electrode and a mass of depolarizing mix and which is surrounded by an electrical insulating jacket which is closed by a metal cover and which has a layer of moldable sealing material interposed between the metal cover and the mix, the upper end of the metal container terminating below the top of the jacket and having its upper edge deflected inwardly and embedded in the mass of sealing material, the carbon electrode extending above the top of the metal cover and serving also as a vent for allowing excessive gas pressure within the cell to be relieved.

Further and more limited objects of the invention will appear as the description proceeds and by reference to the accompanying drawing in which Fig. 1 is a central vertical sectional view through a dry cell constructed in accordance with my invention; Fig. 2 is a top plan view of the same and Fig. 3 is a vertical sectional view of a slightly modified form of the invention.

Referring now to the drawing, the cell consists essentially of a metal container 1 which is preferably a drawn zinc can which is preferably circular in shape and in which is arranged a mass of depolarizing mix 2 and a carbon electrode 3. The mass of mix is insulated from the container by a paper lining 4 which is folded over the top of the mix as shown in Fig. 1. The carbon electrode 5 is positioned centrally of the mass of mix and extends thereabove a considerable distance. Surrounding the carbon electrode and resting on the mass of mix is a disk 5 formed of corrugated paper or other suitable material having on each side thereof a layer of paper. This corrugated paper disk preferably closes the upper end of the metal container. Surrounding the metal container is a jacket 6 preferably formed of electrical insulating material, which may or may not be waterproofed, the upper end of which extends a considerable distance above the upper end of the zinc container. Closing the upper end of the cell is a layer or mass of moldable sealing material 7 which is formed of a suitable sealing compound such as sealing wax or other suitable sealing material which will bond with the paper jacket and also with the carbon electrode. Closing the top of the paper jacket and surrounding the carbon electrode is a metal cover 8 which is preferably circular in shape and has the outer periphery thereof deflected slightly upwardly and engaging the upper edge of the paper jacket. The metal disk or cover 8 is provided with a central opening the edges of which are deflected inwardly as shown at 9 and embedded in the mass of sealing material. The upper end of the carbon electrode projects through the opening in the metal cover and secured thereover is a vented metal cap 10.

The layer of sealing material 7 and the corrugated disk 5 serve to effectively prevent the moisture within the cell attacking or corroding the metal cover. The carbon electrode is impregnated with a waterproofing material but is sufficiently porous to permit excessive gas pressure within the cell to be relieved therethrough. The metal cover 8 closes the top of the paper jacket and a portion of the moldable sealing material is disposed exterior of the metal cover and is molded about the carbon electrode as shown in Fig. 1.

It will therefore be seen that the metal cover is held in place by the molded sealing material a portion of which is disposed inside of the metal cover and a portion of which is disposed outside of the metal cover. The metal cover is also held by the sealing material which is bonded to the inner side thereof and by reason of the fact that the edges of the opening in the metal cover are deflected inwardly and embedded in the sealing material. It will also be seen that the top of the zinc can is disposed a distance below the top of the paper jacket and that the layer of moldable sealing compound effectively closes the upper end of the container and is bonded with the paper jacket and serves to hold the same in place.

It will now be clear that I have provided a dry cell which is closed by means of an air tight sealing compound and also by a metal cover which is stronger than an ordinary seal which is apt to break or to have a non-uniform appearance. The metal cover is completely insulated from both the negative zinc element and the positive carbon so that no short circuit is possible when two or more such cells are connected together for use in a flashlight or other device. The paper jacket is also securely fastened in place by the sealing compound so that it cannot slip out of place and cause a short circuit by exposing the sides of the zinc can to a metal surface.

In forming the cell, the carbon electrode and mix are first placed within the zinc container and suitably insulated therefrom. The corrugated paper disk is then secured over the carbon electrode and the cell inserted into the paper jacket. The sealing compound in a molten condition is then poured onto the top of the cell almost to the top of the jacket. The metal cover plate is then placed over the carbon electrode and on top of the molten sealing compound. The metal cover is then pressed down with a die until the outer edge of the same is pressed against the top of the jacket. That portion of the sealing compound which flows up through the central opening in the cover is pressed into the shape shown around the upper end of the carbon electrode by means of the die.

In Fig. 3 I have disclosed a slightly modified form of my invention which is identical with the construction shown in Figs. 1 and 2 except that I make use of a zinc container the upper edges of which are turned over inwardly and downwardly and embedded in the layer of sealing compound, as shown at 1a. In other respects this form of the invention is identical with that disclosed in Figs. 1 and 2.

It will now be clear that I have provided a dry cell and seal therefor which will accomplish the objects of the invention as hereinbefore stated. It is of course to be understood that the embodiments of the invention herein disclosed are merely illustrative and not to be considered in a limiting sense as various changes may be made in the details of construction as well as in the method of assembly without departing from the spirit of my invention, for example, the cover may possibly be formed of a material other than metal such as bakelite, beetlewax, celluloid or the like. The invention is therefore limited only in accordance with the scope of the appended claims.

Having thus described my invention, what I claim is:

1. A dry cell comprising a container in which is disposed a mass of mix and a centrally disposed carbon electrode, an insulating jacket surrounding said container, a metal cover surrounding said carbon electrode and closing said jacket, and insulated from said container and carbon electrode, and a mass of molded sealing material holding said cover in place and disposed partially interior and partially exterior of said cover, the upper end of said container terminating below said metal cover and having the upper edge thereof turned over inwardly and embedded in the mass of sealing material.

2. A dry cell comprising a metal container in which is disposed a carbon electrode and a mass of depolarizing mix insulated therefrom, an insulating jacket surrounding said container, a cover closing said jacket and having a central opening therein through which said carbon electrode extends, the edges of said cover contiguous to said carbon electrode being deflected inwardly and embedded in a mass of sealing material, a portion of said sealing material being disposed exterior of said cover and molded about said electrode and holding the cover in place, said container terminating below the upper edge of said jacket and having the upper edges thereof turned over inwardly and embedded in said mass of sealing material.

3. A dry cell comprising a metal container in which is disposed a mass of mix and a carbon electrode, an insulating jacket surrounding said container and extending above the upper edge thereof, a metal cover surrounding said carbon electrode and spaced from said container and closing said jacket, a mass of sealing material closing said cell and disposed partially interior and partially exterior of said cover, that portion of the sealing material exterior of said cover being molded about said carbon electrode and serving to secure said cover in place, said cover having a hole therein through which said carbon electrode is accessible, the edges of said cover contiguous to said carbon electrode being deflected inwardly and embedded in said mass of sealing material.

4. A dry cell comprising a metal container in which is disposed a mass of mix and a carbon electrode, an insulating jacket surrounding said container and extending above the upper edge thereof, a metal cover surrounding said carbon electrode and spaced from said container and closing said jacket, a mass of sealing material closing said cell and disposed partially interior and partially exterior of said cover, that portion of the sealing material exterior of said cover being molded about said carbon electrode and serving to secure said cover in place, said cover having a hole therein through which said carbon electrode extends, the edges of said cover contiguous to said carbon electrode being deflected inwardly and embedded in said mass of sealing material.

5. A dry cell comprising a metal container in which is disposed a mass of mix and a carbon electrode, an insulating jacket surrounding said container and extending above the upper edge thereof, a metal cover surrounding said carbon electrode and spaced from said container and closing said jacket, a mass of sealing material closing said cell and disposed partially interior and partially exterior of said cover, that portion of the sealing material exterior of said cover being molded about said carbon electrode and serving to secure said cover in place, said cover having a hole therein through which said carbon electrode extends, the edges of said cover contiguous to said carbon electrode being deflected inwardly and embedded in said mass of sealing material, and a metal cap covering said carbon electrode and having its edges embedded in the molded mass of sealing material.

CYRIL P. DEIBEL.